US012770615B2

(12) United States Patent
Mahfuz et al.

(10) Patent No.: US 12,770,615 B2
(45) Date of Patent: Oct. 20, 2026

(54) AUTOMATED AUDIO CAPTION CORRECTION USING FALSE ALARM AND MISS DETECTION

(71) Applicant: QUALCOMM Incorporated, San Diego, CA (US)

(72) Inventors: Rehana Mahfuz, Sunnyvale, CA (US); Yinyi Guo, San Diego, CA (US); Arvind Krishna Sridhar, San Diego, CA (US); Erik Visser, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 128 days.

(21) Appl. No.: 18/811,349

(22) Filed: Aug. 21, 2024

(65) Prior Publication Data

US 2025/0078828 A1 Mar. 6, 2025

Related U.S. Application Data

(60) Provisional application No. 63/580,665, filed on Sep. 5, 2023.

(51) Int. Cl.
*G10L 15/19* (2013.01)
*G10L 15/01* (2013.01)
*G10L 15/02* (2006.01)

(52) U.S. Cl.
CPC .............. *G10L 15/19* (2013.01); *G10L 15/01* (2013.01); *G10L 15/02* (2013.01)

(58) Field of Classification Search
CPC ........ G06F 40/166; G06F 1/163; G06F 3/167; G06F 16/22; G06F 16/243;
(Continued)

(56) References Cited

U.S. PATENT DOCUMENTS 5,987,414 A * 11/1999 Sabourin ................. G10L 15/26 704/E15.044
6,442,518 B1 * 8/2002 Van Thong ............. G10L 15/26 704/235

(Continued)

OTHER PUBLICATIONS

International Search Report and Written Opinion—PCT/US2024/043489—ISA/EPO—Oct. 28, 2024.

(Continued)

*Primary Examiner* — Gerald Gauthier
(74) *Attorney, Agent, or Firm* — QUALCOMM Incorporated; Espartaco Diaz Hidalgo

(57) ABSTRACT

Systems and techniques are provided for natural language processing. A system generates a plurality of tokens (e.g., words or portions thereof) based on input content (e.g., text and/or speech). The system searches through the plurality of tokens to generate a first ranking the plurality of tokens based on probability. The system generates natural language inference (NLI) scores for the plurality of tokens to generate a second ranking of the plurality of tokens based on faithfulness to the input content (e.g., whether the tokens produce statements that are true based on the input content). The system generates output text that includes at least one token selected from the plurality of tokens based on the first ranking and the second ranking.

20 Claims, 9 Drawing Sheets

(58) Field of Classification Search
CPC .. G06F 16/3329; G06F 16/338; G06F 40/237; G10L 15/01; G10L 15/02; G10L 15/06; G10L 15/10; G10L 15/16; G10L 15/19; G10L 15/22; G10L 15/26; G10L 17/02; G10L 21/06; G10L 25/51; G10L 17/06; G10L 25/24; G10L 25/66; G11B 27/10; G06N 3/0442; G06N 3/0499; G06N 5/022; G06Q 10/06393; G06Q 30/016; G06V 10/82; H04L 51/02
See application file for complete search history.

(56) References Cited

U.S. PATENT DOCUMENTS

| | | | | |
|---|---|---|---|---|
| 9,202,460 | B2 * | 12/2015 | Chang | G10L 15/06 |
| 10,679,620 | B2 * | 6/2020 | Talwar | G06F 3/167 |
| 11,386,890 | B1 * | 7/2022 | Fan | G10L 15/197 |
| 11,735,186 | B2 * | 8/2023 | Zimmerman | G06F 40/166 704/235 |
| 11,861,315 | B2 * | 1/2024 | Sethi | G06F 1/163 |
| 12,198,048 | B2 * | 1/2025 | Singh | G06F 16/243 |
| 2007/0118373 | A1 * | 5/2007 | Wise | G10L 21/06 704/235 |
| 2016/0322051 | A1 * | 11/2016 | Milstein | G10L 15/10 |
| 2017/0270919 | A1 * | 9/2017 | Parthasarathi | G10L 17/06 |
| 2018/0143956 | A1 | 5/2018 | Skarbovsky et al. | |
| 2018/0174576 | A1 * | 6/2018 | Soltau | G06N 3/0442 |
| 2019/0378533 | A1 * | 12/2019 | Chao | G10L 17/02 |
| 2019/0385711 | A1 * | 12/2019 | Shriberg | G10L 25/66 |
| 2020/0034421 | A1 * | 1/2020 | Ferrucci | G06F 16/22 |
| 2020/0035226 | A1 * | 1/2020 | Hamada | G10L 15/10 |
| 2020/0082822 | A1 * | 3/2020 | Kneller | G06Q 30/016 |
| 2020/0193353 | A1 * | 6/2020 | Weisman | G06Q 10/06393 |
| 2020/0302019 | A1 * | 9/2020 | Hall | G10L 15/22 |
| 2020/0349954 | A1 * | 11/2020 | Yoshioka | G10L 15/16 |
| 2020/0380403 | A1 * | 12/2020 | Aggarwal | G06V 10/82 |
| 2021/0074277 | A1 * | 3/2021 | Lewis | G10L 15/22 |
| 2021/0118442 | A1 * | 4/2021 | Poddar | G06F 16/3329 |
| 2021/0217421 | A1 * | 7/2021 | Trim | G10L 15/26 |
| 2021/0272040 | A1 * | 9/2021 | Johnson | G10L 25/24 |
| 2021/0407510 | A1 * | 12/2021 | Wang | G11B 27/10 |
| 2022/0093088 | A1 * | 3/2022 | Rangarajan Sridhar | G06F 16/338 |
| 2022/0108714 | A1 * | 4/2022 | Novikova | G06N 3/0499 |
| 2022/0199079 | A1 * | 6/2022 | Hanson | H04L 51/02 |
| 2022/0277738 | A1 * | 9/2022 | Aher | G10L 15/22 |
| 2022/0358917 | A1 * | 11/2022 | Chaland | G06F 3/167 |
| 2022/0415320 | A1 * | 12/2022 | Zheng | G06F 40/237 |
| 2023/0135179 | A1 * | 5/2023 | Mielke | G06N 5/022 704/232 |
| 2025/0046333 | A1 * | 2/2025 | Graciarena | G10L 25/51 |
| 2025/0078828 | A1 * | 3/2025 | Mahfuz | G10L 15/02 |

OTHER PUBLICATIONS

Zhang H., et al., "Improving Audio Caption Fluency with Automatic Error Correction", arXiv:2306.10090v1 [eess.AS], Arxiv.Org, Cornell University Library, 201 Olin Library Cornell University Ithaca, NY 14853, Jun. 16, 2023, pp. 1-9, XP091541500, The Whole Document.

* cited by examiner

AUTOMATED AUDIO CAPTION CORRECTION USING FALSE ALARM AND MISS DETECTION

PRIORITY CLAIM

The present application claims priority to U.S. Provisional Patent Application No. 63/580,665, filed on Sep. 5, 2023, the contents of which are incorporated herein by reference in its entirety and for all purposes.

TECHNICAL FIELD

The present disclosure generally relates to audio and video captions and an approach to provide caption correction. For example, aspects of the present disclosure relate to systems and techniques for generating audio captions from input data and in some cases audio tags from the input data. In some cases, the system disclosed herein can determine false alarms and missed detections in the audio captions and can generate a corrected caption associated with the input data.

BACKGROUND

Audio captioning relates to the task for describing an audio clip using a sentence. For example, an audio clip may include the sounds of a person walking, then a dog barking and a child crying. An audio captioning system can receive such audio and generate a caption such as "a person is walking, then a dog barks and thereafter a child cries." Currently in the art there is not an ability to find false positives (words that should not be in the caption) or false negatives (missing words that should be in the caption) in the audio caption.

SUMMARY

Systems and techniques are described herein for generating a corrected caption for a candidate caption which describes audio data and/or video data. In general, the systems and techniques can include using a captioning model to generate a candidate caption from input data and a tagging model that generates candidate tags from the input data. A false alarm and miss detector can be used to determine, based on the candidate caption and the candidate tags, whether there are false alarms (false positives) in the candidate caption or false negatives (misses of words that should be there) in the candidate caption. A caption correction engine can generate, based on the false alarms and the false negatives, a corrected caption. In some cases, the candidate caption may be an audio caption and the input data may be audio data. While examples described herein relate to audio captioning, the principles can also apply to video captioning (e.g., where a video is processed to identify or describe what is occurring in the video). For instance, the systems and techniques can be applied to a caption with video data as the input data. Further, other input modalities which can include gesture or motion input, including multi-modal input, may also be covered based on the principles disclosed herein beyond audio captioning and video captioning.

In some aspects, an apparatus to generate correct captions of input data is provided. The apparatus includes one or more memories configured to store the input data and one or more processors coupled to the one or more memories and configured to: receive a set of audio tags associated with the input data; receive a set of detections, the set of detections generated from a candidate caption associated with the input data; determine a set of false negatives based on a first comparison of the set of audio tags and the set of detections; determine a set of false positives based on a second comparison of the set of audio tags and the set of detections; and generate, based on the set of false negatives and the set of false positives, a corrected caption relative to the candidate caption.

In some aspects, a method for generating correct captions of input data is provided. The method includes one or more steps comprising: receiving a set of audio tags associated with the input data; receiving a set of detections, the set of detections generated from a candidate caption associated with the input data; determining a set of false negatives based on a first comparison of the set of audio tags and the set of detections; determining a set of false positives based on a second comparison of the set of audio tags and the set of detections; and generating, based on the set of false negatives and the set of false positives, a corrected caption relative to the candidate caption.

In some aspects, a non-transitory computer-readable medium is provided having stored thereon instructions which, when executed by one or more processors, cause the one or more processors to be configured to: receive a set of audio tags associated with the input data; receive a set of detections, the set of detections generated from a candidate caption associated with the input data; determine a set of false negatives based on a first comparison of the set of audio tags and the set of detections; determine a set of false positives based on a second comparison of the set of audio tags and the set of detections; and generate, based on the set of false negatives and the set of false positives, a corrected caption relative to the candidate caption.

In some aspects, an apparatus for generating correct captions of input data includes one or more: means for receiving a set of detections, the set of detections generated from a candidate caption associated with the input data; means for determining a set of false negatives based on a first comparison of the set of audio tags and the set of detections; means for determining a set of false positives based on a second comparison of the set of audio tags and the set of detections; and means for generating, based on the set of false negatives and the set of false positives, a corrected caption relative to the candidate caption.

In some aspects, one or more of the apparatuses described herein is, is part of, and/or includes an extended reality (XR) device or system (e.g., a virtual reality (VR) device, an augmented reality (AR) device, or a mixed reality (MR) device), a mobile device or wireless communication device (e.g., a mobile telephone or other mobile device), a wearable device (e.g., a network-connected watch or other wearable device), a camera, a personal computer, a laptop computer, a vehicle or a computing device or component of a vehicle, a server computer or server device (e.g., an edge or cloud-based server, a personal computer acting as a server device, a mobile device such as a mobile phone acting as a server device, an XR device acting as a server device, a vehicle acting as a server device, a network router, or other device acting as a server device), another device, or a combination thereof. In some aspects, the apparatus includes a camera or multiple cameras for capturing one or more images. In some aspects, the apparatus further includes a display for displaying one or more images, notifications, and/or other displayable data. In some aspects, the apparatuses described above can include one or more sensors (e.g., one or more inertial measurement units (IMUs), such as one or more gyroscopes, one or more gyroscopes or gyrometers, one or more accelerometers, any combination thereof, and/or other sensor.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and aspects, will become more apparent upon referring to the following specification, claims, and accompanying drawings.

BRIEF DESCRIPTION OF THE DRAWINGS

Illustrative aspects of the present application are described in detail below with reference to the following figures.

DETAILED DESCRIPTION

Certain aspects of this disclosure are provided below. Some of these aspects may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects only, and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the scope of the application as set forth in the appended claims.

Figure 1:
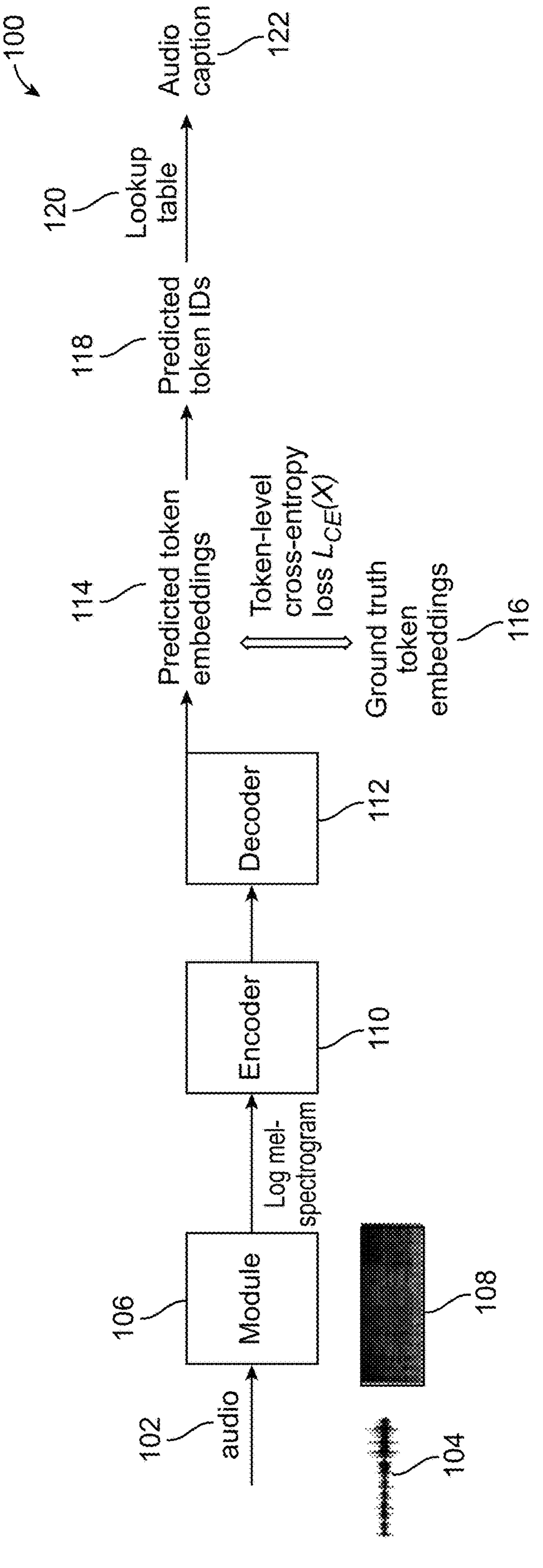
FIG. 1 is a conceptual diagram illustrating an audio captioning model, in accordance with some examples.

FIG. 1 illustrates a conceptual diagram of an audio captioning model 100. The general concept is to receive audio (such as an audio signal) and generate an audio caption 122 that describes the sounds found in the audio signal. As shown in FIG. 1, the audio captioning model 100 receives input audio 102. The input audio 102 can be represented in a frequency spectrum 104. The input audio 102 can be received at a module 106 that can be used to process the input audio 102 to generate a log-mel-spectrogram. A log-mel-spectrogram relates to a frequency-domain filter bank applied to audio signals that are windowed in time. One way to visualize audio data is to plot the frequency spectrum of an audio signal, also known as the frequency domain representation. The spectrum can be computed using the discrete Fourier transform or DFT. The spectrum describes the individual frequencies that make up the signal and the strength of the signal.

While it is possible to plot the spectrum of the entire sound or input audio 102, looking at a small region instead is useful. One problem is that the spectrum only shows a frozen snapshot of the frequencies at a given instant. One way to see how the sound changes over time is to take multiple DFTs, each covering only a small slice of time, and stack the resulting spectra together into a spectrogram.

A spectrogram plots the frequency content of an audio signal as the audio changes over time. The spectrogram allows one to see time, frequency, and amplitude all on one graph. The algorithm that performs the computation can be the STFT or Short Time Fourier Transform.

The spectrogram is an informative audio tool. In speech, the spectrogram can identify different vowel sounds as each vowel is characterized by particular frequencies. Where the input audio 102 has other features or characteristics to be processed to generate captions, the spectrogram can identify the various aspects of the sounds which can be used to generate the audio captions.

In a spectrogram, the x-axis represents time as in the waveform visualization and the y-axis represents frequency in Hz. The intensity of color in a spectrogram gives the amplitude or power of the frequency component at each point in time, measured in decibels (dB).

The spectrogram is created by taking short segments of the audio signal, typically lasting a few milliseconds, and calculating the discrete Fourier transform of each segment to obtain its frequency spectrum. The resulting spectra are then stacked together on the time axis to create the spectrogram. Each vertical slice in the image corresponds to a single frequency spectrum, seen from the top. By default, an algorithm such as librosa.stft( ) splits the audio signal into segments of 2048 samples, which gives a good trade-off between frequency resolution and time resolution. Other sampling values can be used as well as the reference to 2048 samples is by way of example only.

Since the spectrogram and the waveform are different views of the same data, it is possible to turn the spectrogram back into the original waveform using the inverse STFT. However, the process requires the phase information in addition to the amplitude information. If the spectrogram was generated by a machine learning model, it typically only outputs the amplitudes. In that case, one can use a phase reconstruction algorithm such as the classic Griffin-Lim algorithm, or use a neural network called a vocoder, to reconstruct a waveform from the spectrogram.

Spectrograms are not just used for visualization. Many machine learning models will take spectrograms as input—as opposed to waveforms—and produce spectrograms as output.

A variant of a spectrogram used for speech processing is the mel-spectrogram on a logarithm scale. A log-mel-spectrogram 108 is a variation of the spectrogram that is commonly used in speech processing and machine learning tasks. The log-mel-spectrogram 108 is similar to a spectrogram in that the log-mel-spectrogram 108 shows the frequency content of an audio signal over time, but on a different frequency axis.

In a standard spectrogram, the frequency axis is linear and is measured in hertz (Hz). However, the human auditory system is more sensitive to changes in lower frequencies than higher frequencies, and the human sensitivity decreases logarithmically as frequency increases. The mel scale ("mel" comes from "melody" or sounds that a human can hear) is a perceptual scale that approximates the non-linear frequency response of the human ear.

To create a mel-spectrogram, the STFT is used just like before, splitting the audio into short segments to obtain a sequence of frequency spectra. Additionally, each spectrum is sent through a set of filters, the so-called mel filterbank, to transform the frequencies to the mel scale to generate the log-mel-spectrogram 108.

In one example above, a value of n_mels stands for the number of mel bands to generate. The mel bands define a set of frequency ranges that divide the spectrum into perceptually meaningful components, using a set of filters whose shape and spacing are chosen to mimic the way the human ear responds to different frequencies. Common values for n_mels are 40 or 80. A value Fmax indicates the highest frequency (in Hz).

Just as with a regular spectrogram, the strength of the mel frequency components can be expressed in decibels. The strength value is commonly referred to as a log-mel-spectrogram 108, because the conversion to decibels involves a logarithmic operation. Compared to a standard spectrogram, a mel-spectrogram can capture more meaningful features of the audio signal for human perception, making it a popular choice in tasks such as speech recognition, speaker identification, and music genre classification. Therefore, in the context of this disclosure, the use of a log-mel-spectrogram is helpful to be able to ultimate generate an audio caption from the input audio 102. However, the use of the log-mel-spectrogram 108 is just one example as other spectrograms or data structures can be used as well.

The log-mel-spectrogram 108 is received at an encoder 110 that can be any audio embedding network such as audio masked autoencoder (MAE) which encodes audio spectrogram patches with a high masking ratio and feeds only non-masked tokens through encoder layers. A decoder 112 (e.g., a transformer decoder, a recurrent neural network (RNN), or other transformer-based networks) generates predicted token embeddings 114 which can be, through a token-level cross entropy loss function $L_{CE}(x)$, used to generate ground truth token embeddings 116. Predicted token IDs 118 can be applied to a lookup table 120 to generate an audio caption 122 that characterizes the input audio 102.

As noted above, most of the examples disclosed herein relate to audio input and generating audio captions. However, the principles can also apply to input including video or images. Thus, when "input data" or "input" is referred to herein, it can apply generally to audio, video or images, or multimodal input as the input data. Thus, the "input audio 102" may also refer to video data or other types of data.

Figure 2:
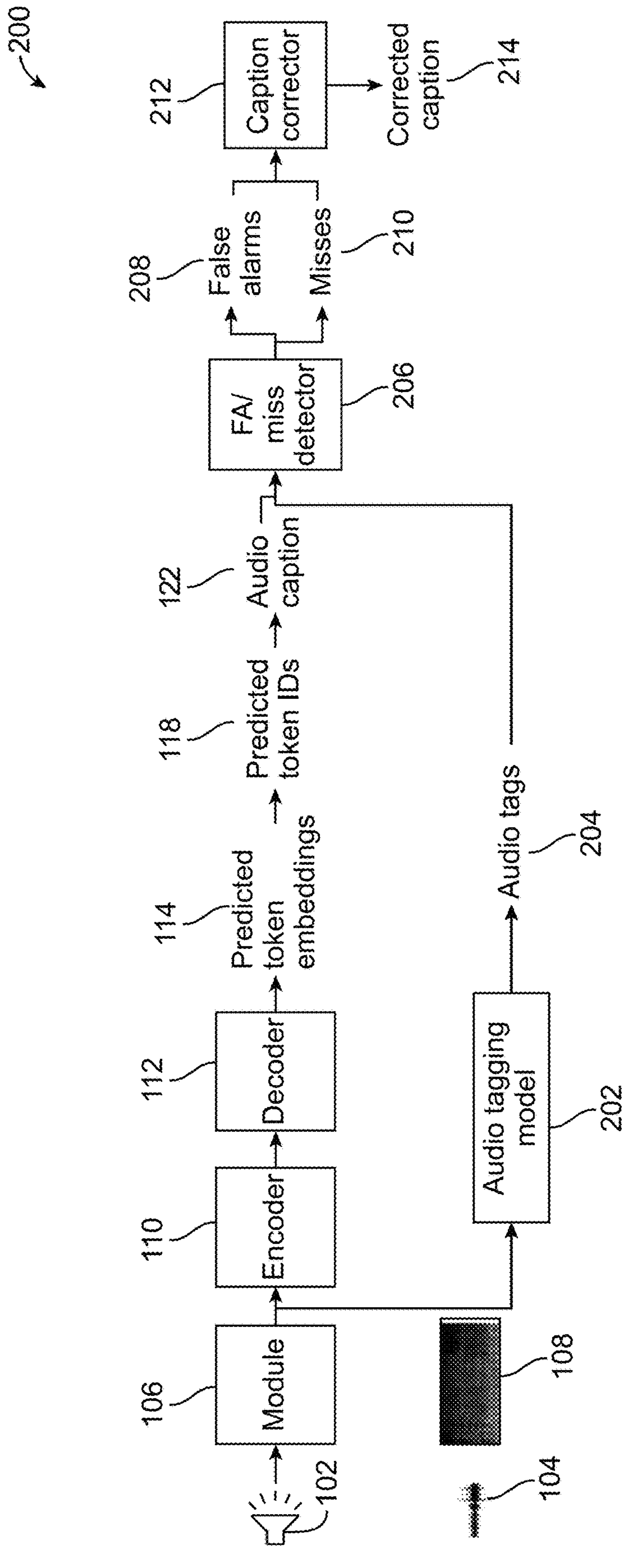
FIG. 2 is a conceptual diagram illustrating an example of a captioning model and false alarm/miss detector including a correction module, in accordance with some examples.

FIG. 2 is a conceptual diagram illustrating an example of a captioning model and false alarm/miss detector including a correction module 200, in accordance with some examples. Where similar components from FIG. 1 are included in FIG. 2, a consistent call-out number is used. Input audio 102 can be represented by a frequency spectrum 104. A module 106 can convert the input audio 102 into a log-mel-spectrogram 108 which can be provided to the encoder 110 to generate encoder output. The encoder output can be provided to a decoder 112 that generates predicted token embeddings 114 which are used to generate the predicted token IDs 118 and to generate an audio caption 122. The audio caption 122 represents a description of the input audio 102. For example, the audio caption 122 describes the sounds in the input audio 102 when the input is audio, or the audio caption 122 might be a caption that describes what is in a video when the input audio 102 is video data. The audio caption 122 can also be characterized as a candidate caption. The log-mel-spectrogram 108 is also provided to an audio tagging model 202 to generate audio tags 204. The audio tagging model 202 performs a different process than the encoder 110 and decoder 112. The audio caption 122 is generally structured like a sentence that is used to describe the input audio 102 and the audio tags 204 are typically individual words that relate to the components or features of the input audio 102. A false alarm/miss detector 206 uses both the audio caption 122 and the audio tags 204 to identify whether in the audio caption 122 there are false alarms or false positives where there are words that should not be in the audio caption 122 or misses or false negatives where words are missing from the audio caption 122. The false alarms 208 and miss(es) 210 are provided to a caption correction engine 212 to generate the corrected caption 214. In some cases, the corrected caption 214 can be output using one or more output devices. For example, the output device can include one or more displays, one or more speakers, one or more haptic output mechanisms (e.g., one or more linear resonant actuators (LRAs), one or more direct current (DC) motors, etc.), any combination thereof, and/or other output devices.

Figure 3A:
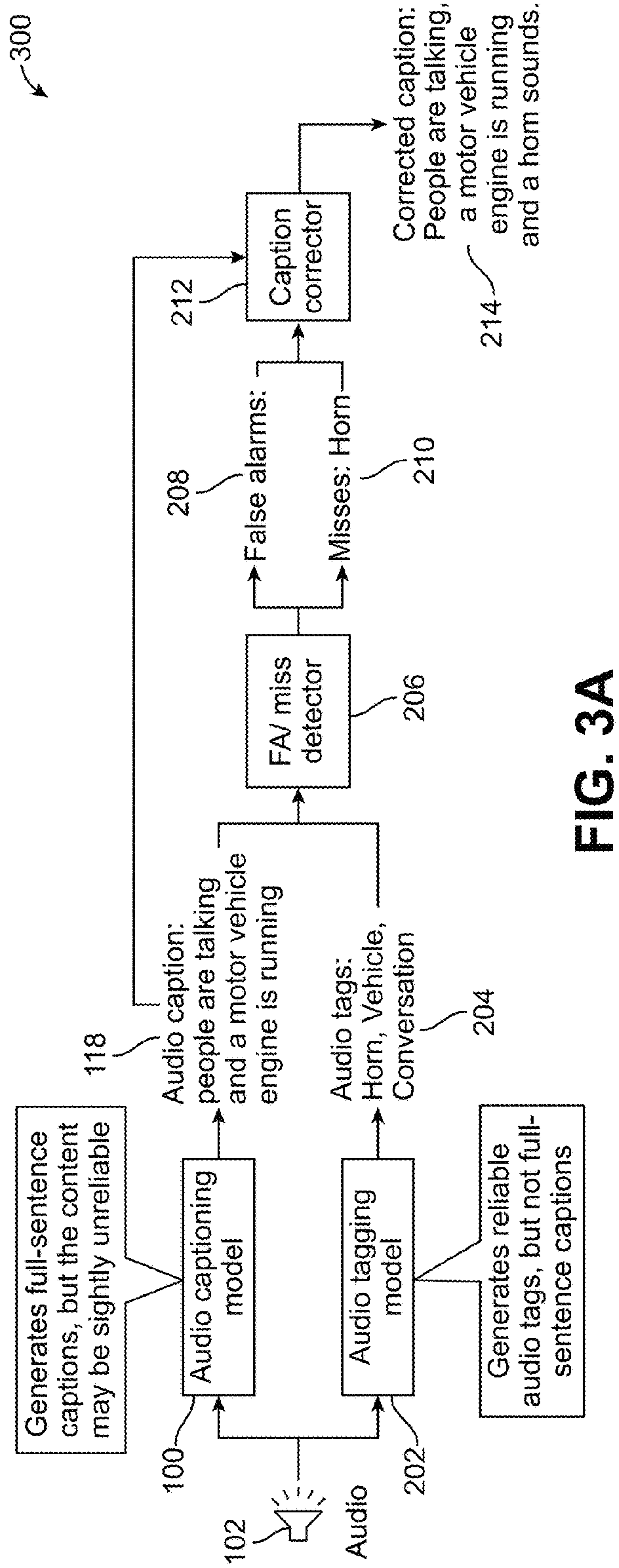
FIG. 3A is a block diagram of a system for generating corrected captions, in accordance with some examples.

FIG. 3A is a block diagram of a system for generating corrected captions 300, in accordance with some examples. The system for generating corrected captions 300 includes an audio captioning model 100 that receives input audio 102. In one example of the system for generating corrected captions 300, the input data can be audio that includes sounds of people talking, a motor vehicle running and the sound of a horn. The audio captioning model 100 generates a full-sentence caption with the challenge or problem that the content in the full-sentence caption might be unreliable.

The system for generating corrected captions 300 also includes an audio tagging model 202 that receives the input audio 102 and generates reliable audio tags. Note that the audio tagging model 202 however does not generate full-sentence captions. An example of an audio caption 122 generated by the audio captioning model 100 is: "People are talking and a motor vehicle engine is running." An example of audio tags 204 generated by the audio tagging model include "horn, vehicle, conversation." A false alarm/miss detector 206 is used to determine if there are false alarms 208 in the audio caption 122 or any miss(es) 210 in the audio caption 122. In one example, the term "horn" is missing from the audio caption 122. There are no false alarms that are identified in the above example. The false alarms 208 and miss(es) 210 are provided to the caption correction engine 212. The audio caption 122 is also provided to the caption correction engine 212. The false alarms 208 and miss(es) 210 are used by the caption correction engine 212 to determine or fix problems with the audio caption 122. The output generated is a corrected caption 214 which in the example is that "people are talking, a motor vehicle is running and a horn sounds."

In FIG. 3A, no "false alarm" is listed. An illustrative example of a false alarm can include that the predicted token IDs 118 (or audio captions) indicate that a sound of a tree falling was heard. The false alarm can be "falling tree," as there was no audio tag that suggested the sound of a tree falling.

Figure 3B:
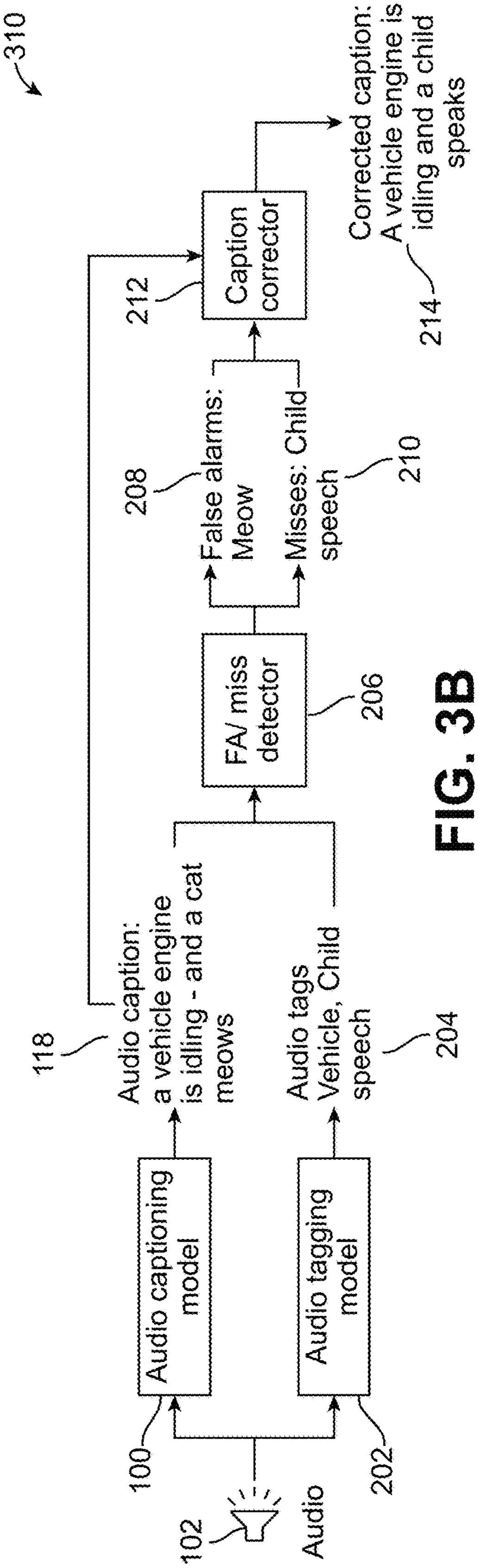
FIG. 3B is a block diagram of an alternate system for generating corrected captions, in accordance with some examples.

FIG. 3B is a block diagram of an engine for generating corrected captions 310, in accordance with some examples. The components in the example of FIG. 3B are the same as the components in FIG. 3A. The input audio 102 can relate to sounds of a vehicle and a child speaking. In one example, the audio caption 122 is "A vehicle engine is idling and a cat meows." In the example, the audio captioning model 100 determined that there was the sound of a cat meowing in the input audio 102. The audio tags 204 that are generated include: "vehicle, child speech." The false alarm/miss detector 206 determines that there are false alarms 208 that can include, for example, "meow" meaning that the term "meow" was in the audio caption 122 but should not be there. The miss(es) 210 in this example includes "child speech" which means that the audio caption 122 should have include child speech but did not. The caption correction engine 212 in one example outputs a corrected caption 214 that states: "A vehicle engine is idling and a child speaks." The caption correction engine 212 corrects the audio caption 122 from referencing that a cat meows to including the concept that a child speaks.

Figure 4:
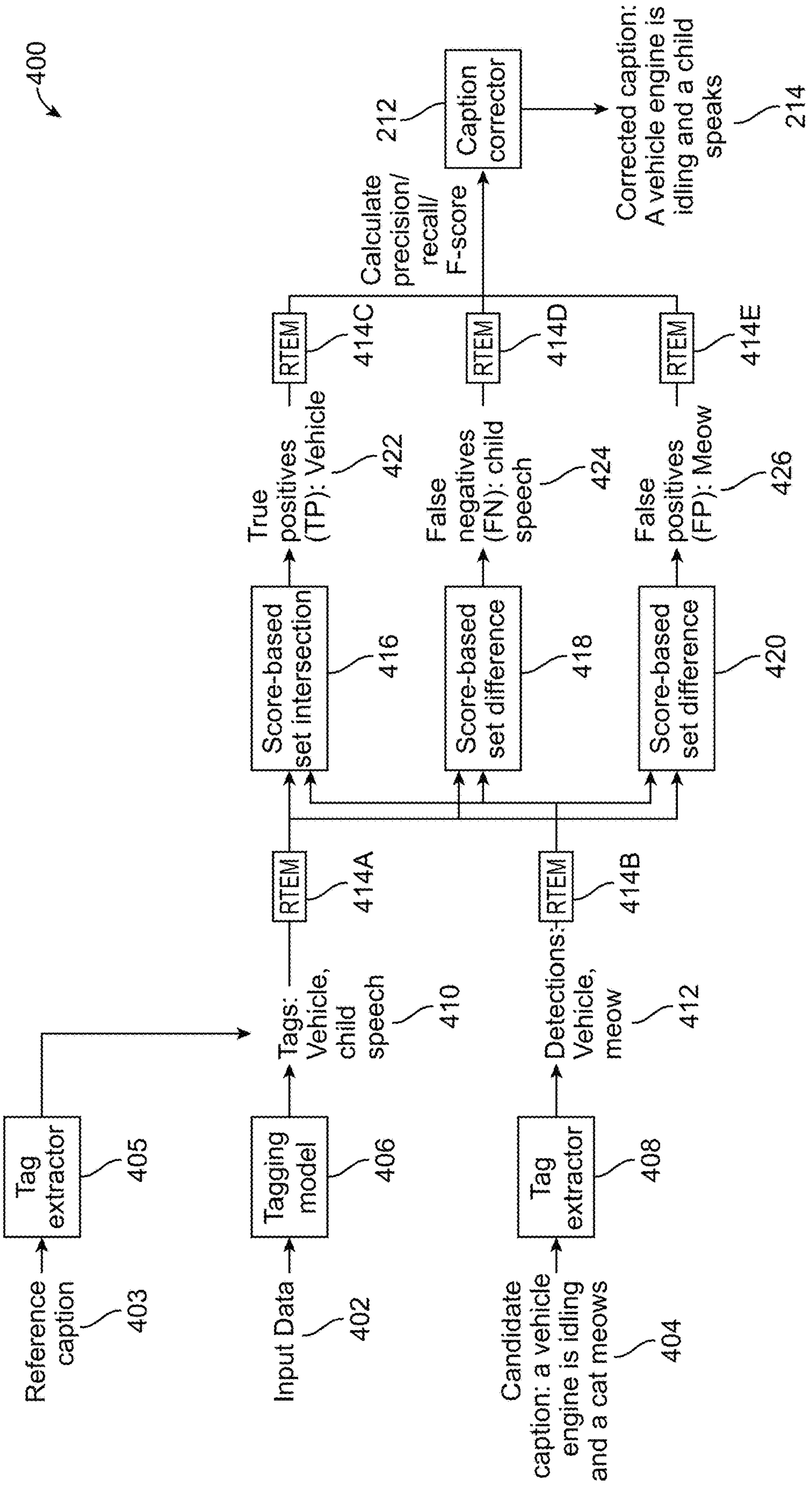
FIG. 4 is a conceptual diagram illustrating an overall system for generating corrected captions, in accordance with some examples.

FIG. 4 is a conceptual diagram illustrating a system 400 for obtaining corrected captions, in accordance with some examples. In one case, the system 400 for obtaining corrected captions provides a way to correct a caption based on the misses and false alarms identified with respect to audio tags generated by an auto tagging model or by some other approach such as audio tags generated from a reference caption. As shown, input data 402 can be provided to a tagging model 406. The input data 402 can be video, an image or audio and can include for example audio or images of a vehicle idling and perhaps audio or video of a child speaking. The tagging model 406 outputs tags 410 that can include for example "vehicle, child speech." The tags 410 may also be a set of tags generated from a reference caption 403 which might be generated. The reference caption would be in a sentence form such as "This image [or audio] includes a vehicle idling and a child speaking." The one or more tag extractors (e.g., the first audio tag extractor 405 and the second tag extractor 408) can receive the reference caption 403 and extract tags from the reference caption 403.

A candidate caption 404 is provided to a tag extractor 408 that generates detections 412 such as "vehicle, meow" from the candidate caption 404. In some cases, the tags 410 and the detections 412 may each have redundant tags in some cases. In some examples, the system 400 may include one or more redundant tag elimination modules (RTEMs) that can be used to eliminate redundant terms. In other examples, the system 400 may not include any redundant tag elimination modules. For instance, an RTEM 414A can be configured to eliminate any redundant tags in the tags 410. For example, if the tags include "vehicle, car, child speech", the output of the RTEM 414A might be "vehicle, child speech" as "car" is redundant to "vehicle." Another redundant tag elimination module or an RTEM 414B can be configured to eliminate any redundant tags in the detections 412. The tag 410 and the detections 412 are each provided to three components. First, a score-based set intersection module 416 generates true positives (TPs). In one example, where the tags 410 are "vehicle, child speech" and the detections 412 are "vehicle, meow", the term "vehicle" is a true positive indicating that it is found in both the tags 410 and the detections 412. The score-based set intersection module 416 calculates, for sets of strings a (the tags 410) and b (e.g., the detections 412) a score-based set intersection $(a, b)=\{x: x \in a \text{ and } \ni y \in b: \text{score}(x, y) > \text{thresh}\}$. The output can be the true positives (TPs) or TPs 422 which in the example is the word "vehicle."

A first score-based set difference module 418 receives the tags 410 and the detections 412 and for the sets of strings a (e.g., the tags 410) and b (e.g., the detections 412), calculates a score-based set difference $(a, b)=\{x: \ni y \in a: \text{score}(x, y) > \text{thresh1} \text{ and } \forall z \in b \text{ score}(y, z) < \text{thresh2}\}$. The output in the example are false negatives (FNs) such as FNs 424 which in one example includes "child speech." In one example, the score can be obtained from applying a cosine similarity between text embeddings of the strings. In one example, the values of thresh and thresh1 are set to be high, thresh2 is set to be low.

A second score-based set difference module 420 receives the tags 410 and the detections 412, and for the sets of strings a (e.g., the detections 412) and b (the tags 410), calculates a score-based set difference $(a, b)=\{x: \ni y \in a: \text{score}(x, y) > \text{thresh1} \text{ and } \forall z \in b \text{ score}(y, z) < \text{thresh2}\}$. The output represents false positives (FPs) of the FPs 426, which in the example of FIG. 4 includes the word "meow." Note that the set of audio tags, such as tags 410, and the detections 412 are reversed in the second score-based set difference module 420 with respect to the first score-based set difference module 418.

The TPs 422, the FNs 424 and the FPs 426 can respectively have redundant tags eliminated by respective redundant tag elimination modules (RTEMs) such as the RTEM 414C, the RTEM 414D, and the RTEM 414E. In one example, for a set of strings S, the function is, for all pairs (m, n): $m \in S$, $n \in S$: If score(m, n)>thresh3, the process includes removing n from the set S. The set of strings S can include the TPs 422, the FNs 424 and/or the FPs 426. In the example, a score is determined by applying a cosine similarity between text embeddings of the strings. A value of thresh3 can be set to be high. These and other algorithms or functions can be used to determine the TPs 422, the FNs 424 and the FPs 426 and to reduce redundant tags in these sets of data. Note that the RTEMs such as the RTEM 414C, the RTEM 414D, and the RTEM 414E are optional.

The TPs 422, the FNs 424 and/or the FPs 426 (with or without redundant tags removed) are used to generate output such as a calculated precision, recall value and/or F-score. Such data can be provided to a caption correction engine 212 which as described above can be used to generate a corrected caption 214 such as "A vehicle engine is idling and a child speaks." Again, the corrected caption 214 can reference to audio data, video data, text data and/or other types of input data.

Figure 5:
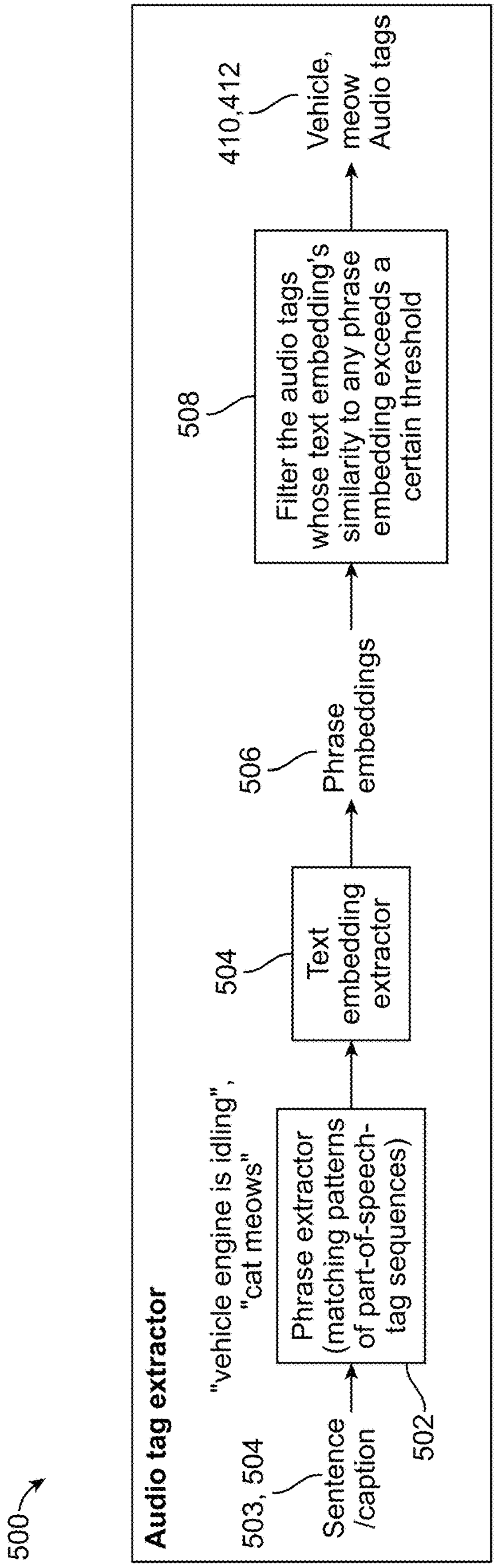
FIG. 5 is a block diagram of a tag extractor that generates tags from an input sentence or caption, in accordance with some examples.

FIG. 5 is a block diagram of a tag extractor 500 that generates tags from an input sentence or the reference caption 403 and/or the candidate caption 404, in accordance with some examples. Assume that the input sentence or the reference caption 403 and/or the candidate caption 404 in one example is "A vehicle engine is idling and a cat meows." A phrase extractor 502 may generate, from the reference caption 403 and/or the candidate caption 404, the phrases "vehicle engine is idling" and "cat meows." In some example systems, the phrase extractor 502 is optional. One reason to include the phrase extractor 502 is that if it is omitted, audio tags can be filtered by comparing them directly with the captions' text embedding. The phrases can be provided to a text embedding extractor 504 that generates phrase embeddings 506. For example, those of skill in the art will understand tools for performing a text embedding extraction. The following are some example tools that could apply: Sentence-BERT (or Bidirectional Encoder Representations from Transformers), CLAP (Contrastive Language-Audio Pretraining) text embedding, and averaging word2vec (which is a neural network approach to learn distributed word vectors in a way that words used in similar syntactic or semantic context lie closer to each other in the distributed vector space), GloVE (Global Vectors for Word Representation) or FastText embeddings.

Figure 6:
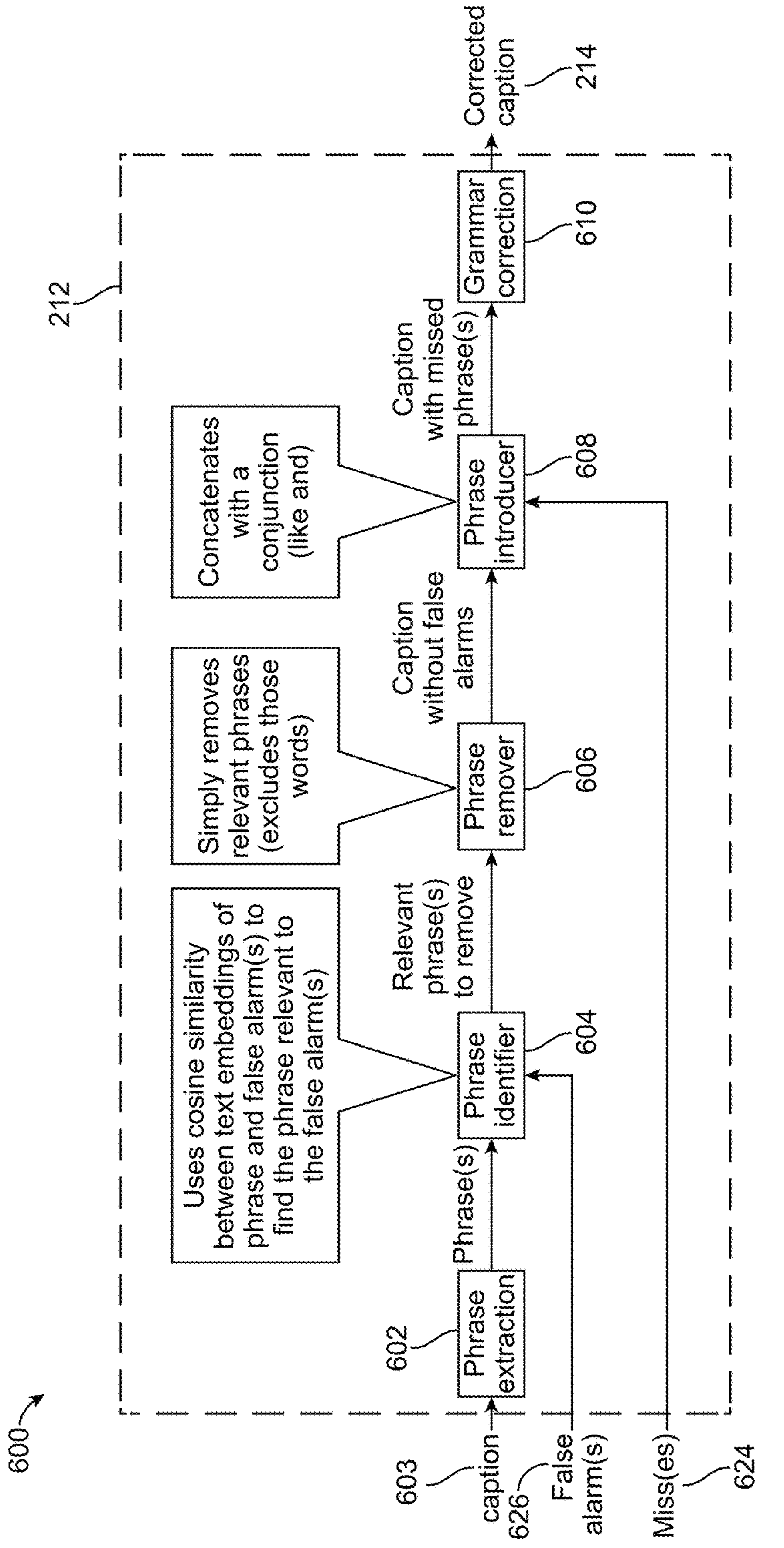
FIG. 6 is a block diagram of a caption correction engine, in accordance with some examples.

FIG. 6 is a block diagram 600 of a caption correction engine 212, in accordance with some examples. The caption correction engine 212 receives a reference caption and/or a candidate caption 603 at a phrase extractor 602. The phrase extractor 602 can extract phrases from the reference caption and/or the candidate caption 603. The phrases and/or false alarms 626 are provided to a phrase identifier 604. The phrase identifier 604 applies a cosine similarity (or some other comparison algorithm) between text embeddings of phrases and/or false alarms 626 to find the phrase relevant to the phrases and/or false alarms 626. The output of the phrase identifier 604 can be a list of relevant phrases to remove from the reference caption and/or the candidate caption 603. If there are any, a phrase remover 606 can be used to remove relevant phrases which can mean excluding the chosen words that need to be removed. The caption(s) without false alarms can then be provided to a phrase introducer 608 which receives the miss(es) 624. The miss(es) 624 shown in FIG. 6 relate to phrases or words that were missed in the reference caption and/or the candidate caption 603 and that should be included. The phrase introducer 608 then adds the miss(es) 624 to the reference caption and/or the candidate caption 603. An optional feature is a grammar correction engine 610 which may correct grammar where necessary to generate the final output of the corrected caption 214.

Figure 7:
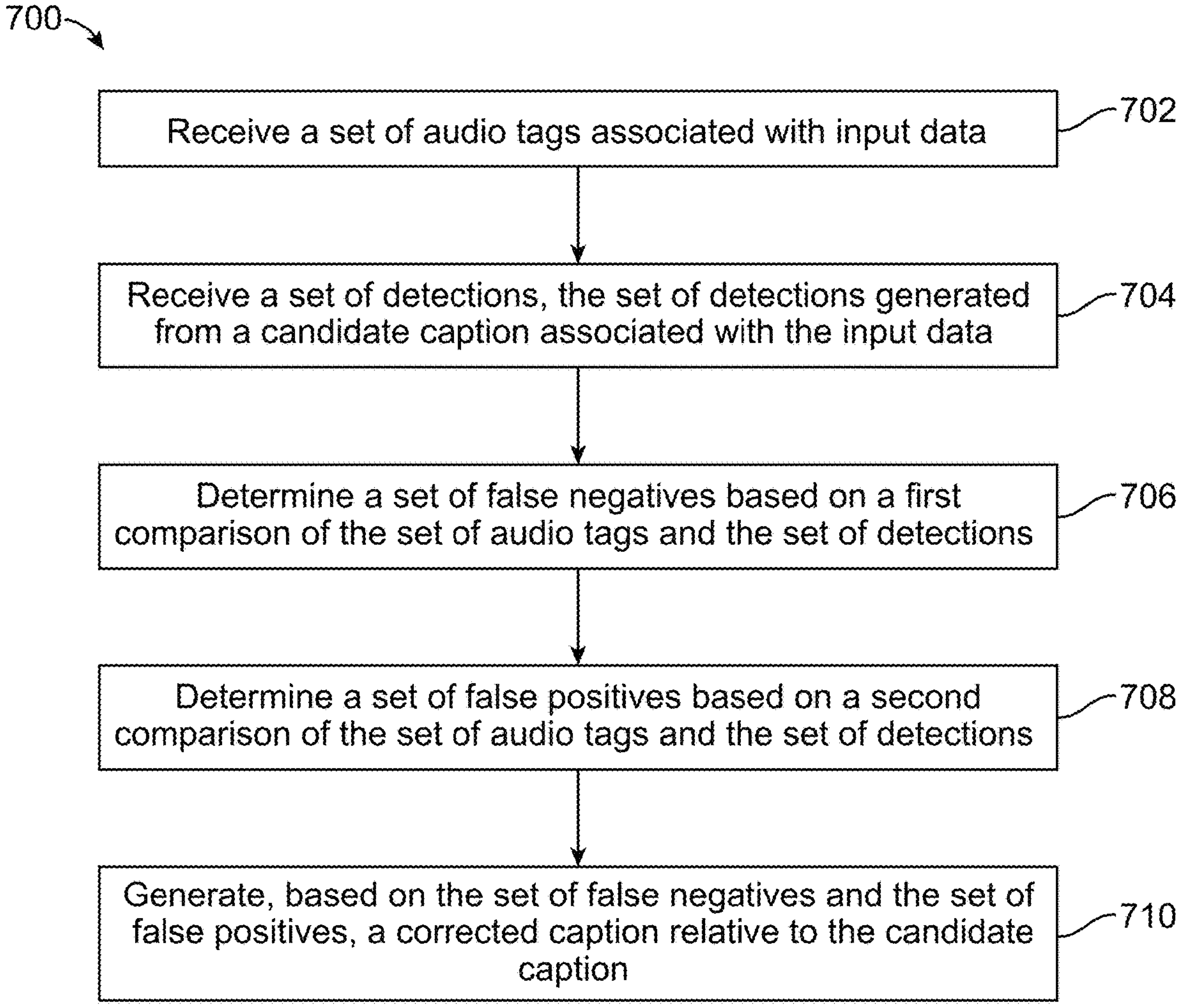
FIG. 7 is a flowchart illustrating an example process for corrected caption generation, in accordance with some examples.

FIG. 7 is a flowchart illustrating an example process 700 for generating correct captions of input data such as the reference caption 403 or the candidate caption 404. The process 700 (or any one or more steps thereof) can be performed by a computing device or system that generates corrected captions or a component (e.g., one or more chipsets, one or more processors such as one or more CPUs, DSPs, neural processing units (NPUs), neural signal processors (NSPs), microcontrollers, ASICs, FPGAs, programmable logic devices, discrete gates or transistor logic components, discrete hardware components, etc., any combination thereof, and/or other component or system) of the computing device or system. For instance, the computing device or system may include, for instance, the system 400 for obtaining corrected captions (or any subsystem thereof) of FIG. 4 and/or a component thereof, such as the tagging model 406, the one or more tag extractor (e.g., a first audio tag extractor 405 and a second audio tag extractor 408), the one or more redundant tag elimination module (RTEM) (e.g., such as the RTEM 414A, the RTEM 414B, the RTEM 414C, the RTEM 414D, and/or the RTEM 414E), the score-based set intersection module 416, the one or more score-based set difference modules (e.g., the first score-based set difference module 418 and the second score-based set difference module 420), the caption correction engine 212, or any combination thereof, the system for generating corrected captions 300 of FIG. 3A (or any subsystem thereof), the engine for generating corrected captions 310 of FIG. 3B (or any subsystem thereof), the computing system 900, or any combination thereof.

At operation 702, the computing device or system (or component thereof) can receive a set of audio tags associated with the input data (e.g., the tags 410 associated with the reference caption 403 or the candidate caption 404 of FIG. 4). The input data can include audio and/or video. The input data can also include images or a combination of different types of data. The captions and tags that are generated as disclosed herein can characterize or describe the input data no matter its configuration. Variations on the disclosed system 400 for obtaining corrected captions are included for various types of input data. For example, an image does not have a time component whereas video data and audio data would include a time component. Therefore, the captions associated with audio or video may have a time ordering of elements such as: “a car drives by and thereafter a cat meows”. An image that shows a car driving by a cat with an open mouth might have a similar caption but without a timing component: “a car drives by and a cat meows.”

In one aspect, the set of audio tags can be generated from a reference caption or alternatively from audio or video. For example, a human may generate a reference caption 403 for input data or the reference caption 403 may come from closed captioning data in a video, for example.

At operation 704, the computing device or system (or component thereof) can receive a set of detections generated from a candidate caption associated with the input data. For example, the system 400 can receive detections 412 generated from a candidate caption 404 of FIG. 4.

At operation 706, the computing device or system (or component thereof) can determine a set of false negatives (e.g., the false negatives (FNs) 424 of FIG. 4) based on a first comparison of the set of audio tags and the set of detections. In some aspects, the computing device or system (or at least one subsystem thereof) is configured to determine the set of false negatives using a first score-based set difference algorithm.

At operation 708, the computing device or system (or component thereof) can determine a set of false positives (e.g., the FPs 426 of FIG. 4) based on a second comparison of the set of audio tags and the set of detections. In some aspects, the computing device or system (or component thereof) can determine the set of false positives using a second score-based set difference algorithm.

At operation 710, the computing device or system (or component thereof) can generate, based on the set of false negatives and the set of false positives (e.g., the FNs 424 and the FPs 426 of FIG. 4), a corrected caption relative to the candidate caption (e.g., the corrected caption 214 relative to the candidate caption 404 of FIG. 2, FIG. 3, FIG. 4). In some cases, the corrected caption 214 can be output using one or more output devices. For instance, the computing device or system can include the one or more output devices or can output the corrected caption to another device or system including the one or more output devices. In some examples, the output device can include one or more displays, one or more speakers, one or more haptic output mechanisms (e.g., one or more linear resonant actuators (LRAs), one or more direct current (DC) motors, etc.), any combination thereof, and/or other output devices.

In some aspects, the computing device or system (or component thereof) can determine a set of true positives based on a third comparison of the set of audio tags and the set of detections. In some cases, the computing device or system (or component thereof) can generate the corrected caption further based on the set of true positives. For example, the computing device or system (or component thereof) can determine the set of true positives using a score-based set intersection algorithm.

In some examples, the computing device or system (or component thereof) can calculate at least one of a precision score, a recall value, or an F-score based on the first comparison, the second comparison, and the third comparison.

In some cases, the computing device or system (or component thereof) can eliminate, via a redundant tag elimination module (e.g., the RTEM 414A of FIG. 4), redundant tags in at least one of the set of audio tags (e.g., the tags 410), the set of detections (e.g., the detections 412), the set of true positives (e.g., TPs 422), the set of false positives (e.g., FPs 426), and/or the set of false negatives (e.g., FNs 424). In some aspects, the computing device or system (or component thereof) can process a reference caption using a first audio tag extractor (e.g., the first audio tag extractor 405 of FIG. 4) to generate the set of audio tags (e.g., the tags 410). In some examples, the computing device or system (or component thereof) can process the candidate caption (e.g., the candidate caption 404) using a second audio tag extractor (e.g., the second audio tag extractor 408 of FIG. 4) to generate the set of detections (e.g., the detections 412).

In one aspect, the first audio tag extractor can include a phrase extractor (e.g., the phrase extractor 502 of the first audio tag extractor 405 shown in FIG. 5), a text embedding extractor (e.g., the text embedding extractor 504 of FIG. 5), and a filter (e.g., the filter 508 of FIG. 5) to process the reference caption or the candidate caption (e.g., the reference caption 403 or the candidate caption 404 of FIG. 4) to generate the set of audio tags such (e.g., the tags 410). The second audio tag extractor 408 can include a phrase extractor (e.g., the phrase extractor 502 of FIG. 5), a text embedding extractor (e.g., the text embedding extractor 504), and a filter (e.g., the filter 508), which can process the candidate caption (e.g., the candidate caption 404) to generate the set of detections (e.g., the detections 412).

In another aspect, the computing device or system (or component thereof) can generate the corrected caption using a caption correction engine (e.g., the caption correction engine 212 of FIG. 2, FIG. 3, etc.). The caption correction engine 212 can include a phrase extractor (e.g., phrase extractor 602 of FIG. 6) to extract a phrase from the reference caption (e.g., reference caption 403) or the candidate caption (e.g., the candidate caption 404), a phrase identifier (e.g., the phrase identifier 604) to identify, based on a false alarm, a relevant phrase to remove from the phrase, a phrase remover (e.g., the phrase remover 606) to remove the relevant phrase from the phrase to generate a caption without false alarms, and a phrase introducer (e.g., the phrase introducer 608) to introduce, based on a missed phrase, the missed phrase to the caption without false alarms to generate a caption with the missed phrase. In some cases, the corrected caption (e.g., the corrected caption 214) is based on the caption with the missed phrase. In some aspects, the caption correction engine (e.g., the caption correction engine 212) further can include a grammar correction engine (e.g., the grammar correction engine 610 of FIG. 6). The grammar correction engine can receive the caption with the missed phrase and correct grammar errors to generate the corrected caption (e.g., the corrected caption 214).

In some aspects, a non-transitory computer-readable medium (e.g., memory 915, ROM 920, RAM 925, or cache 911 of FIG. 9) having stored thereon instructions which, when executed by one or more processors (e.g., processor 912 of FIG. 9), cause the one or more processors to be configured to: receive a set of audio tags associated with the input data; receive a set of detections, the set of detections generated from a candidate caption associated with the input data; determine a set of false negatives based on a first comparison of the set of audio tags and the set of detections; determine a set of false positives based on a second comparison of the set of audio tags and the set of detections; and generate, based on the set of false negatives and the set of false positives, a corrected caption relative to the candidate caption.

In some examples, the system for generating corrected captions includes: means for generating a plurality of tokens based on input content; means for searching through the plurality of tokens to generate a first ranking the plurality of tokens based on probability; means for receiving a set of detections, the set of detections generated from a candidate caption associated with the input data; means for determining a set of false negatives based on a first comparison of the set of audio tags and the set of detections; means for determining a set of false positives based on a second comparison of the set of audio tags and the set of detections; and means for generating, based on the set of false negatives and the set of false positives, a corrected caption relative to the candidate caption.

The means for performing these operations can include, for instance, the system for obtaining corrected captions in FIG. 4 having a tagging model 406, one or more tag extractors (e.g., a first audio tag extractor 405 and/or a second audio tag extractor 408), one or more redundant tag elimination module (RTEM) (e.g., such as the RTEM 414A, the RTEM 414B, the RTEM 414C, the RTEM 414D, and/or the RTEM 414E), a score-based set intersection module 416, one or more score-based set difference module such as a first score-based set difference module 418 and/or a second score-based set difference module 420, and a caption correction engine 212, the computing system 900, or a combination thereof.

An apparatus or system to generate correct captions of input data can include the system 400 in FIG. 4 having a tagging model 406, one or more tag extractors (e.g., the first audio tag extractor 405 and/or the second audio tag extractor 408), one or more RTEM (e.g., such as the RTEM 414A, the RTEM 414B, the RTEM 414C, the RTEM 414D, and/or the RTEM 414E), a score-based set intersection module 416, one or more score-based set difference module such as the first score-based set difference module 418 and/or the second score-based set difference module 420, and a caption correction engine 212, the computing system 900, and/or a combination thereof. The apparatus can include one or more memories (e.g., memory 915, ROM 920, RAM 925, or cache 911 of FIG. 9) configured to store the input data and one or more processors (i.e., processor 912 of FIG. 9) coupled to the one or more memories and configured to: receive a set of audio tags associated with the input data; receive a set of detections, the set of detections generated from a candidate caption associated with the input data; determine a set of false negatives based on a first comparison of the set of audio tags and the set of detections; determine a set of false positives based on a second comparison of the set of audio tags and the set of detections; and generate, based on the set of false negatives and the set of false positives, a corrected caption relative to the candidate caption.

In some examples, the processes described herein (e.g., process 700 and/or any other process described herein) may be performed by a can be performed using a system that generates corrected captions, which may include, for instance, the system 400 (or any subsystem thereof) in FIG. 4 having a tagging model 406, one or more tag extractors (e.g., a first audio tag extractor 405 and/or a second audio tag extractor 408), one or more RTEM (e.g., such as the RTEM 414A, the RTEM the 414B, the RTEM 414C, the RTEM 414D, and/or the RTEM 414E), a score-based set intersection module 416, one or more score-based set difference module such as the first score-based set difference module 418 and/or the second score-based set difference module 420, and a caption correction engine 212, system for generating corrected captions 300 of FIG. 3A (or any subsystem thereof), the engine for generating corrected captions 310 of FIG. 3B (or any subsystem thereof), the computing system 900, or a combination thereof. For instance, a computing device with the computing device architecture of the computing system 900 shown in FIG. 9 can implement the operations of FIG. 7 and/or the components and/or operations described herein with respect to any of FIGS. 1, 2, 3A, 3B, 4, 5, 6, 8 and/or 9.

The computing device (e.g., device or the computing system 900 of FIG. 9) can include any suitable device, such as a mobile device (e.g., a mobile phone), a desktop computing device, a tablet computing device, an XR device (e.g., a VR headset, an AR headset, AR glasses, etc.), a wearable device (e.g., a network-connected watch or smartwatch, or other wearable device), a server computer, a vehicle (e.g., an autonomous vehicle) or computing device of the vehicle, a robotic device, a laptop computer, a smart television, a camera, and/or any other computing device with the resource capabilities to perform the processes described herein, including the process 700 and/or any other process described herein. In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The process 700 is illustrated as logical flow diagrams, the operation of which represents a sequence of operations that can be implemented in hardware, computer instructions, or a combination thereof. In the context of computer instructions, the operations represent computer-executable instructions stored on one or more computer-readable storage media (e.g., memory 915, ROM 920, RAM 925, or cache 911 of FIG. 9) that, when executed by one or more processors (e.g., processor 912), perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 700 and/or any other process described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 8:
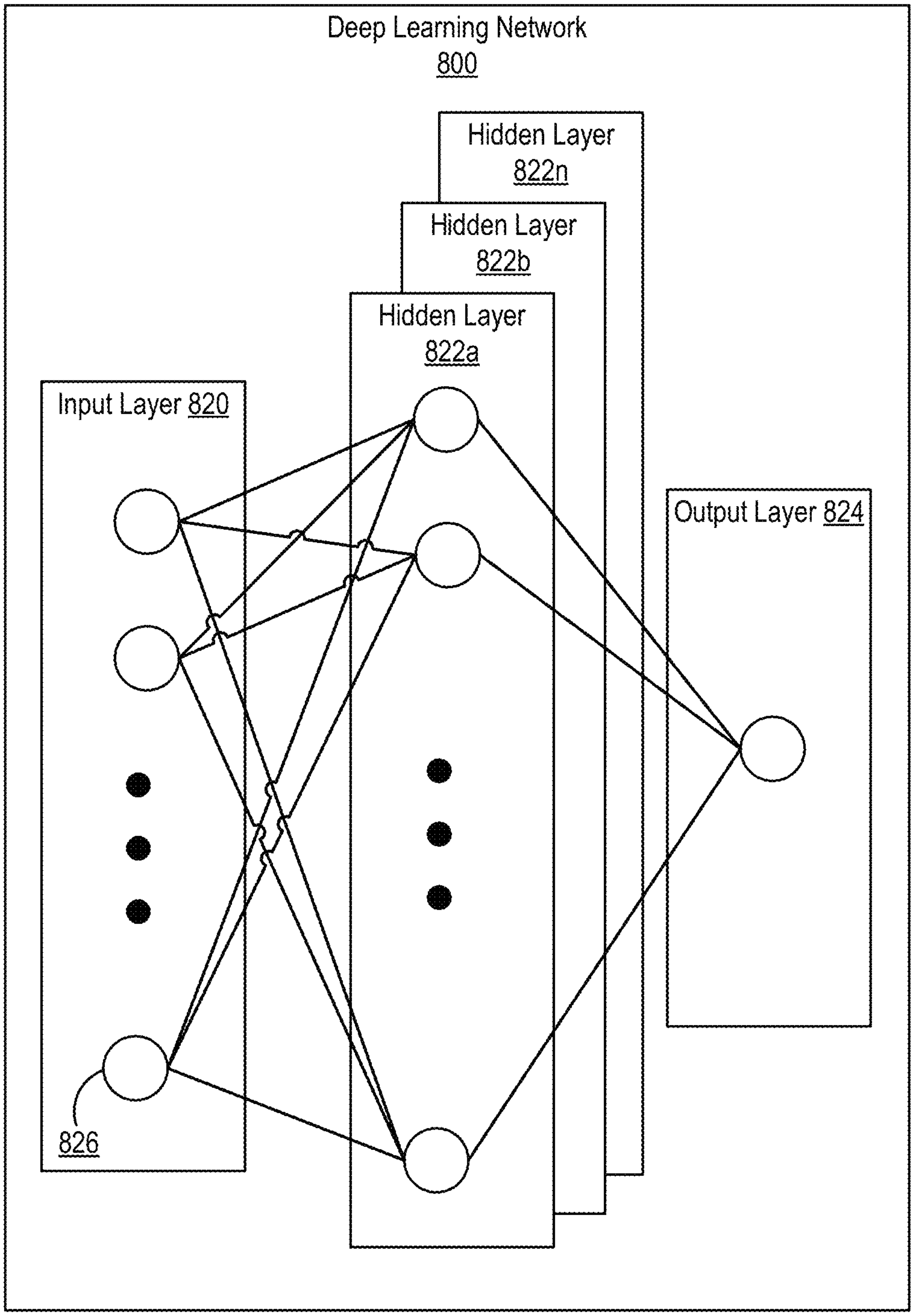
FIG. 8 is a diagram illustrating an example neural network, in accordance with some examples.

As described herein, the neural network 800 of FIG. 8 may be implemented using a neural network or multiple neural networks. FIG. 8 is an illustrative example of a deep learning neural network that can be used by the neural network 800 of FIG. 8. An input layer 820 includes input data. In one illustrative example, the input layer 820 can include data representing the pixels of an input video frame. The neural network 800 includes multiple hidden layers 822*a*, 822*b*, through 822*n*. The hidden layers 822*a*, 822*b*, through 822*n* include "n" number of hidden layers, where "n" is an integer greater than or equal to one. The number of hidden layers can be made to include as many layers as needed for the given application. The neural network 800 further includes an output layer 824 that provides an output resulting from the processing performed by the hidden layers 822*a*, 822*b*, through 822*n*. In one illustrative example, the output layer 824 can provide a classification for an object in an input video frame. The classification can include a class identifying the type of object (e.g., a person, a dog, a cat, or other object).

The neural network 800 is a multi-layer neural network of interconnected nodes. Each node can represent a piece of information. Information associated with the nodes is shared among the different layers and each layer retains information as information is processed. In some cases, the neural network 800 can include a feed-forward network, in which case there are no feedback connections where outputs of the network are fed back into itself. In some cases, the neural network 800 can include a recurrent neural network, which can have loops that allow information to be carried across nodes while reading in input.

Information can be exchanged between nodes through node-to-node interconnections between the various layers. Nodes of the input layer 820 can activate a set of nodes in the first hidden layer 822*a*. For example, as shown, each of the input nodes of the input layer 820 is connected to each of the nodes of the first hidden layer 822*a*. The nodes of the hidden layers 822*a*, 822*b*, through 822*n* can transform the information of each input node by applying activation functions to the information. The information derived from the transformation can then be passed to and can activate the nodes of the next hidden layer 822*b*, which can perform their own designated functions. Example functions include convolutional, up-sampling, data transformation, and/or any other suitable functions. The output of the hidden layer 822*b* can then activate nodes of the next hidden layer, and so on. The output of the last hidden layer 822*n* can activate one or more nodes of the output layer 824, at which an output is provided. In some cases, while nodes (e.g., node 826) in the neural network 800 are shown as having multiple output lines, a node has a single output and all lines shown as being output from a node represent the same output value.

In some cases, each node or interconnection between nodes can have a weight that is a set of parameters derived from the training of the neural network 800. Once the neural network 800 is trained, it can be referred to as a trained neural network, which can be used to classify one or more objects. For example, an interconnection between nodes can represent a piece of information learned about the interconnected nodes. The interconnection can have a tunable numeric weight that can be tuned (e.g., based on a training dataset), allowing the neural network 800 to be adaptive to inputs and able to learn as more and more data is processed.

The neural network 800 is pre-trained to process the features from the data in the input layer 820 using the different hidden layers 822*a*, 822*b*, through 822*n* in order to provide the output through the output layer 824. In an example in which the neural network 800 is used to identify objects in images, the neural network 800 can be trained using training data that includes both images and labels. For instance, training images can be input into the network, with each training image having a label indicating the classes of the one or more objects in each image (basically, indicating to the network what the objects are and what features they have). In one illustrative example, a training image can include an image of a number 2, in which case the label for the image can be [0 0 1 0 0 0 0 0 0 0].

In some cases, the neural network 800 can adjust the weights of the nodes using a training process called backpropagation. Backpropagation can include a forward pass, a loss function, a backward pass, and a weight update. The forward pass, loss function, backward pass, and parameter update is performed for one training iteration. The process can be repeated for a certain number of iterations for each set of training images until the neural network 800 is trained well enough so that the weights of the layers are accurately tuned.

For the example of identifying objects in images, the forward pass can include passing a training image through the neural network 800. The weights are initially randomized before the neural network 800 is trained. The image can include, for example, an array of numbers representing the pixels of the image. Each number in the array can include a value from 0 to 255 describing the pixel intensity at that position in the array. In one example, the array can include a 28×28×3 array of numbers with 28 rows and 28 columns of pixels and 3 color components (such as red, green, and blue, or luma and two chroma components, or the like).

For a first training iteration for the neural network 800, the output will likely include values that do not give preference to any particular class due to the weights being randomly selected at initialization. For example, if the output is a vector with probabilities that the object includes different classes, the probability value for each of the different classes may be equal or at least very similar (e.g., for ten possible classes, each class may have a probability value of 0.1). With the initial weights, the neural network 800 is unable to determine low level features and thus cannot make an accurate determination of what the classification of the object might be. A loss function can be used to analyze error in the output. Any suitable loss function definition can be used. One example of a loss function includes a mean squared error (MSE). The MSE is defined as $$E_{total} = \sum \frac{1}{2}(\text{target} - \text{output})^2,$$

which calculates the sum of one-half times a ground truth output (e.g., the actual answer) minus the predicted output (e.g., the predicted answer) squared. The loss can be set to be equal to the value of $E_{total}$.

The loss (or error) will be high for the first training images since the actual values will be much different than the predicted output. The goal of training is to minimize the amount of loss so that the predicted output is the same as the training label. The neural network 800 can perform a backward pass by determining which inputs (weights) most contributed to the loss of the network, and can adjust the weights so that the loss decreases and is eventually minimized.

A derivative of the loss with respect to the weights (denoted as dL/dW, where W are the weights at a particular layer) can be computed to determine the weights that contributed most to the loss of the network. After the derivative is computed, a weight update can be performed by updating all the weights of the filters. For example, the weights can be updated so that they change in the opposite direction of the gradient. The weight update can be denoted as $$w = w_i - \eta \frac{dL}{dW},$$

where w denotes a weight, $w_i$ denotes the initial weight, and $\eta$ denotes a learning rate. The learning rate can be set to any suitable value, with a high learning rate including larger weight updates and a lower value indicating smaller weight updates.

In some cases, the neural network 800 can be trained using self-supervised learning.

The neural network 800 can include any suitable deep network. One example includes a convolutional neural network (CNN), which includes an input layer and an output layer, with multiple hidden layers between the input and out layers. An example of a CNN is described below with respect to FIG. 9. The hidden layers of a CNN include a series of convolutional, nonlinear, pooling (for downsampling), and fully connected layers. The neural network 800 can include any other deep network other than a CNN, such as an autoencoder, a deep belief nets (DBNs), a Recurrent Neural Networks (RNNs), among others.

In some aspects, training of one or more of the machine learning systems or neural networks described herein (e.g., such as the audio captioning model 100 of FIG. 1, the audio tagging model 202 of FIG. 2, the neural network 800 of FIG. 8, the system or computing system 900 of FIG. 9, among various other machine learning networks described herein) can be performed using online training (e.g., in some case on-device training), offline training, and/or various combinations of online and offline training. In some cases, online may refer to time periods during which the input data (e.g., such as the audio 102 of FIG. 1, etc.) is processed. In some examples, offline may refer to idle time periods or time periods during which input data is not being processed. Additionally, offline may be based on one or more time conditions (e.g., after a particular amount of time has expired, such as a day, a week, a month, etc.) and/or may be based on various other conditions such as network and/or server availability, etc., among various others. In some aspects, offline training of a machine learning model (e.g., a neural network model) can be performed by a first device (e.g., a server device) to generate a pre-trained model, and a second device can receive the trained model from the second device. In some cases, the second device (e.g., a mobile device, an XR device, a vehicle or system/component of the vehicle, or other device) can perform online (or on-device) training of the pre-trained model to further adapt or tune the parameters of the model.

Figure 9:
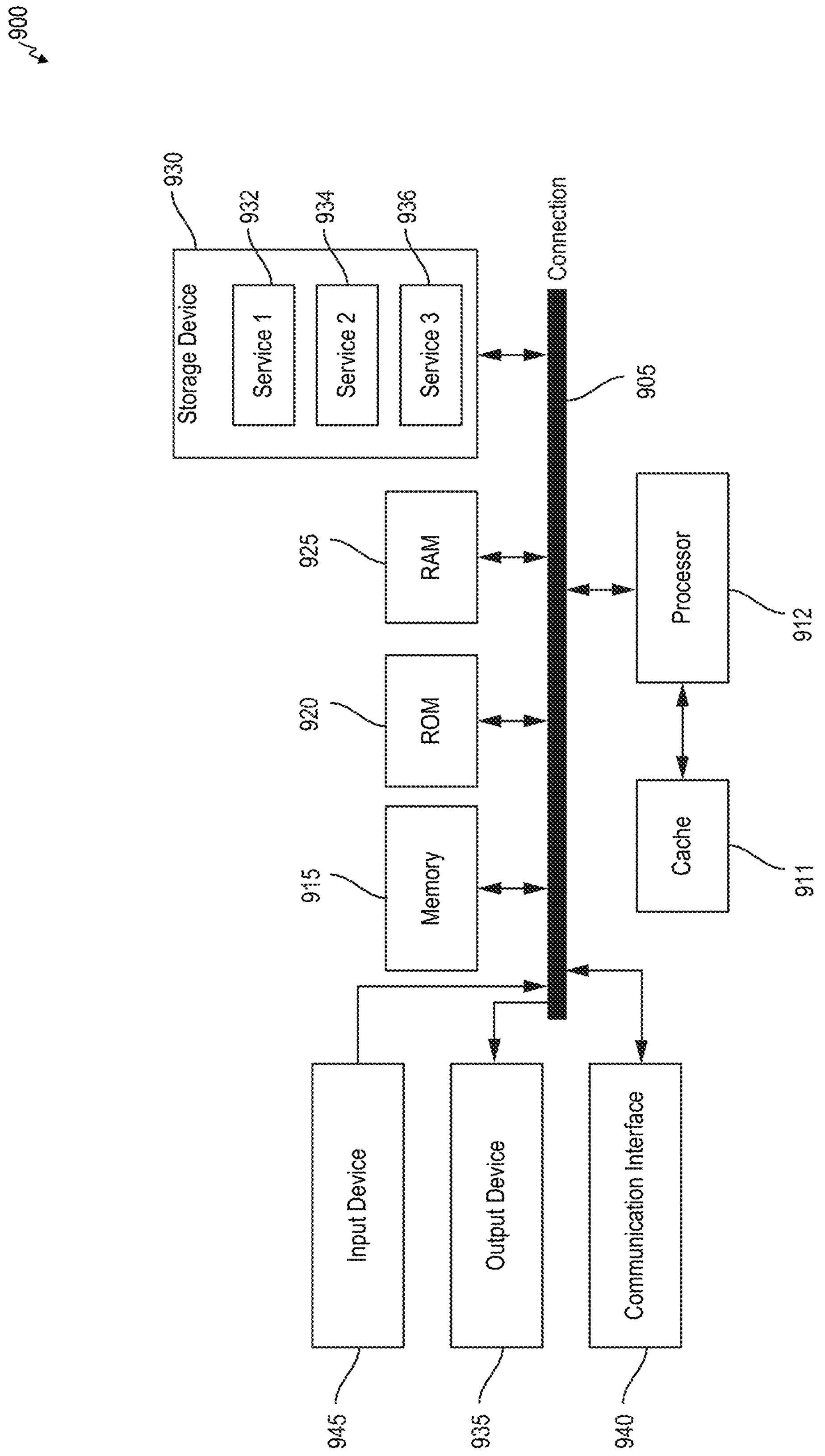
FIG. 9 is a diagram illustrating an example system architecture for implementing certain aspects described herein, in accordance with some examples.

FIG. 9 is a diagram illustrating an example of a system for implementing certain aspects of the present disclosure. In particular, FIG. 9 illustrates an example of computing system 900, which can be for example any computing device making up a computing system, a camera system, or any component thereof in which the components of the system are in communication with each other using connection 905. Connection 905 can be a physical connection using a bus, or a direct connection into processor 912, such as in a chipset architecture. Connection 905 can also be a virtual connection, networked connection, or logical connection.

In some examples, computing system 900 is a distributed system in which the functions described in this disclosure can be distributed within a datacenter, multiple data centers, a peer network, etc. In some examples, one or more of the described system components represents many such components each performing some or all of the function for which the component is described. In some examples, the components can be physical or virtual devices.

Example computing system 900 includes at least one processing unit (CPU or processor) 912 and connection 905 that couples various system components including system memory such as the memory 915, such as read-only memory (ROM) 920 and random access memory (RAM) 925 to processor 912. The computing system 900 can include a cache 911 of high-speed memory connected directly with, in close proximity to, or integrated as part of processor 912.

Processor 912 can include any general purpose processor and a hardware service or software service, such as services 932, 934, and 936 stored in storage device 930, configured to control processor 912 as well as a special-purpose processor where software instructions are incorporated into the actual processor design. Processor 912 may essentially be a completely self-contained computing system, containing multiple cores or processors, a bus, memory controller, cache 911, etc. A multi-core processor may be symmetric or asymmetric.

To enable user interaction, computing system 900 includes an input device 945, which can represent any number of input mechanisms, such as a microphone for speech, a touch-sensitive screen for gesture or graphical input, keyboard, mouse, motion input, speech, etc. Computing system 900 can also include output device 935, which can be one or more of a number of output mechanisms such as one or more displays, one or more speakers, one or more haptic output mechanisms (e.g., one or more linear resonant actuators (LRAs), one or more direct current (DC) motors, etc.), any combination thereof, and/or other output devices. In some instances, multimodal systems can enable a user to provide multiple types of input/output to communicate with computing system 900. Computing system 900 can include communications interface 940, which can generally govern and manage the user input and system output.

The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

The communications interface 940 may also include one or more Global Navigation Satellite System (GNSS) receivers or transceivers that are used to determine a location of the computing system 900 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 930 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L#), resistive random-access memory (RRAM/ReRAM), phase change memory (PCM), spin transfer torque RAM (STT-RAM), another memory chip or cartridge, and/or a combination thereof.

The storage device 930 can include software services, servers, services, etc., that when the code that defines such software is executed by the processor 912, it causes the system to perform a function. In some examples, a hardware service that performs a particular function can include the software component stored in a computer-readable medium in connection with the necessary hardware components, such as processor 912, connection 905, output device 935, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some aspects the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the aspects and examples provided herein. However, it will be understood by one of ordinary skill in the art that the aspects may be practiced without these specific details. For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific aspects thereof, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, A and B and C, or any duplicate information or data (e.g., A and A, B and B, C and C, A and A and B, and so on), or any other ordering, duplication, or combination of A, B, and C. The language "at least one of" a set and/or "one or more" of a set does not limit the set to the items listed in the set. For example, claim language reciting "at least one of A and B" or "at least one of A or B" may mean A, B, or A and B, and may additionally include items not listed in the set of A and B. The phrases "at least one" and "one or more" are used interchangeably herein.

Claim language or other language reciting "at least one processor configured to," "at least one processor being configured to," "one or more processors configured to," "one or more processors being configured to," or the like indicates that one processor or multiple processors (in any combination) can perform the associated operation(s). For example, claim language reciting "at least one processor configured to: X, Y, and Z" means a single processor can be used to perform operations X, Y, and Z; or that multiple processors are each tasked with a certain subset of operations X, Y, and Z such that together the multiple processors perform X, Y, and Z; or that a group of multiple processors work together to perform operations X, Y, and Z. In another example, claim language reciting "at least one processor configured to: X, Y, and Z" can mean that any single processor may only perform at least a subset of operations X, Y, and Z.

Where reference is made to one or more elements performing functions (e.g., steps of a method), one element may perform all functions, or more than one element may collectively perform the functions. When more than one element collectively performs the functions, each function need not be performed by each of those elements (e.g., different functions may be performed by different elements) and/or each function need not be performed in whole by only one element (e.g., different elements may perform different sub-functions of a function). Similarly, where reference is made to one or more elements configured to cause another element (e.g., an apparatus) to perform functions, one element may be configured to cause the other element to perform all functions, or more than one element may collectively be configured to cause the other element to perform the functions.

Where reference is made to an entity (e.g., any entity or device described herein) performing functions or being configured to perform functions (e.g., steps of a method), the entity may be configured to cause one or more elements (individually or collectively) to perform the functions. The one or more components of the entity may include at least one memory, at least one processor, at least one communication interface, another component configured to perform one or more (or all) of the functions, and/or any combination thereof. Where reference to the entity performing functions, the entity may be configured to cause one component to perform all functions, or to cause more than one component to collectively perform the functions. When the entity is configured to cause more than one component to collectively perform the functions, each function need not be performed by each of those components (e.g., different functions may be performed by different components) and/or each function need not be performed in whole by only one component (e.g., different components may perform different sub-functions of a function).

The various illustrative logical blocks, modules, circuits, and algorithm steps described in connection with the examples disclosed herein may be implemented as electronic hardware, computer software, firmware, or combinations thereof. To clearly illustrate the interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, then the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative aspects of the present disclosure include:

Aspect 1. An apparatus to generate correct captions of input data, comprising: one or more memories configured to store the input data; and one or more processors coupled to the one or more memories and configured to: receive a set of audio tags associated with the input data; receive a set of detections, the set of detections generated from a candidate caption associated with the input data; determine a set of false negatives based on a first comparison of the set of audio tags and the set of detections; determine a set of false positives based on a second comparison of the set of audio tags and the set of detections; and generate, based on the set of false negatives and the set of false positives, a corrected caption relative to the candidate caption.

Aspect 2. The apparatus of Aspect 1, wherein the one or more processors are configured to: determine a set of true positives based on a third comparison of the set of audio tags and the set of detections; and generate the corrected caption further based on the set of true positives.

Aspect 3. The apparatus of Aspect 2, wherein the one or more processors are configured to determine the set of true positives using a score-based set intersection algorithm.

Aspect 4. The apparatus of any one of Aspects 2 or 3, wherein the one or more processors are configured to calculate at least one of a precision score, a recall value, or an F-score based on the first comparison, the second comparison, and the third comparison.

Aspect 5. The apparatus of any one of Aspects 1 to 4, wherein the input data comprises at least one of audio or video.

Aspect 6. The apparatus of any one of Aspects 1 to 5, wherein the set of audio tags are generated from a reference caption or audio.

Aspect 7. The apparatus of any one of Aspects 2 to 6, wherein the one or more processors are configured to eliminate redundant tags in at least one of the set of audio tags, the set of detections, the set of true positives, the set of false positives, or the set of false negatives.

Aspect 8. The apparatus of any one of Aspects 1 to 7, wherein the one or more processors are configured to: process a reference caption using a first audio tag extractor to generate the set of audio tags; and process the candidate caption using a second audio tag extractor to generate the set of detections.

Aspect 9. The apparatus of Aspect 8, wherein the first audio tag extractor comprises a phrase extractor, a text embedding extractor, and a filter to process the reference caption to generate the set of audio tags.

Aspect 10. The apparatus of any one of Aspects 8 or 9, wherein the second audio tag extractor comprises a phrase extractor, a text embedding extractor, and a filter to process the candidate caption to generate the set of detections.

Aspect 11. The apparatus of any one of Aspects 1 to 10, wherein the one or more processors are configured to generate the corrected caption using a caption correction engine.

Aspect 12. The apparatus of Aspect 11, wherein the caption correction engine comprises a phrase extractor to extract a phrase from the candidate caption, a phrase identifier to identify, based on a false alarm, a relevant phrase to remove from the phrase, a phrase remover to remove the relevant phrase from the phrase to generate a caption without false alarms, and a phrase introducer to introduce, based on a missed phrase, the missed phrase to the caption without false alarms to generate a caption with the missed phrase, wherein the corrected caption is based on the caption with the missed phrase.

Aspect 13. The apparatus of Aspect 12, wherein the caption correction engine further comprises a grammar correction engine to receive the caption with the missed phrase and correct grammar errors to generate the corrected caption.

Aspect 14. The apparatus of any one of Aspects 1 to 13, wherein the one or more processors are configured to determine the set of false negatives using a first score-based set difference algorithm.

Aspect 15. The apparatus of Aspect 14, wherein the one or more processors are configured to determine the set of false positives using a second score-based set difference algorithm.

Aspect 16. The apparatus of any one of Aspects 1 to 15, further comprising an output device configured to output the corrected caption.

Aspect 17. The apparatus of Aspect 16, wherein the output device comprises at least one of one or more displays or one or more speakers.

Aspect 18. A method for generating correct captions of input data, the method comprising: receiving a set of audio tags associated with the input data; receiving a set of detections, the set of detections generated from a candidate caption associated with the input data; determining a set of false negatives based on a first comparison of the set of audio tags and the set of detections; determining a set of false positives based on a second comparison of the set of audio tags and the set of detections; and generating, based on the set of false negatives and the set of false positives, a corrected caption relative to the candidate caption.

Aspect 19. The method of Aspect 18, further comprising: determining a set of true positives based on a third comparison of the set of audio tags and the set of detections; and generating the corrected caption further based on the set of true positives.

Aspect 20. The method of Aspect 19, wherein determining the set of true positives is performed using a score-based set intersection algorithm.

Aspect 21. The method of any one of Aspects 18 to 20, further comprising calculating the at least one of a precision score, a recall value, or an F-score is based on the first comparison, the second comparison, and the third comparison.

Aspect 22. The method of any one of Aspects 18 to 21, wherein the input data comprises at least one of audio or video.

Aspect 23. The method of any one of Aspects 18 to 22, wherein the set of audio tags are generated from a reference caption or audio.

Aspect 24. The method of any one of Aspects 17 to 23, further comprising: eliminating redundant tags in at least one of the set of audio tags, the set of detections, the set of true positives, or set of false positives, or the set of false negatives.

Aspect 25. The method of any one of Aspects 18 to 24, further comprising: processing a reference caption using a first audio tag extractor to generate the set of audio tags; and processing the candidate caption using a second audio tag extractor to generate the set of detections.

Aspect 26. The method of Aspect 25, wherein the first audio tag extractor comprises a phrase extractor, a text embedding extractor, and a filter to process the reference caption to generate the set of audio tags.

Aspect 27. The method of any one of Aspects 23 or 26, wherein the second audio tag extractor comprises a phrase extractor, a text embedding extractor, and a filter to process the candidate caption to generate the set of detections.

Aspect 28. The method of any one of Aspects 18 to 27, wherein generating the corrected caption is performed using a caption correction engine.

Aspect 29. The method of Aspect 28, wherein the caption correction engine comprises a phrase extractor to extract a phrase from the candidate caption, a phrase identifier to identify, based on a false alarm, a relevant phrase to remove from the phrase, a phrase remover to remove the relevant phrase from the phrase to generate a caption without false alarms, and a phrase introducer to introduce, based on a missed phrase, the missed phrase to the caption without false alarms to generate a caption with the missed phrase, wherein the corrected caption is based on the caption with the missed phrase.

Aspect 30. The method of Aspect 29, wherein the caption correction engine further comprises a grammar correction engine to receive the caption with the missed phrase and correct grammar errors to generate the corrected caption.

Aspect 31. The method of any one of Aspects 18 to 30, wherein determining the set of false negatives is performed using a first score-based set difference algorithm.

Aspect 32. The method of Aspect 29, wherein determining the set of false positives is performed using a second score-based set difference algorithm.

Aspect 33. A non-transitory computer-readable medium having stored thereon instructions which, when executed by one or more processors, cause the one or more processors to be configured to perform operations according to any of Aspects 18 to 33.

Aspect 34. An apparatus comprising one or more means for performing operations according to any of Aspects 18 to 33.

What is claimed is:

1. An apparatus to generate correct captions of input data, comprising:
- one or more memories configured to store the input data; and
- one or more processors coupled to the one or more memories and configured to:
  - receive a set of audio tags associated with the input data;
  - receive a set of detections, the set of detections generated from a candidate caption associated with the input data;
  - determine a set of false negatives in the candidate caption based on a first text-based comparison of the set of audio tags and the set of detections;
  - determine a set of false positives in the candidate caption based on a second text-based comparison of the set of audio tags and the set of detections; and
  - generate, based on an addition of at least one missing term to the candidate caption based on the set of false negatives and removal of at least one false term from the candidate caption based on the set of false positives, a corrected caption relative to the candidate caption.

2. The apparatus of claim 1, wherein the one or more processors are configured to:
- determine a set of true positives based on a third comparison of the set of audio tags and the set of detections; and
- generate the corrected caption further based on the set of true positives.

3. The apparatus of claim 2, wherein the one or more processors are configured to determine the set of true positives using a score-based set intersection algorithm.

4. The apparatus of claim 2, wherein the one or more processors are configured to calculate at least one of a precision score, a recall value, or an F-score based on the first text-based comparison, the second text-based comparison, and the third comparison.

5. The apparatus of claim 1, wherein the input data comprises at least one of audio or video.

6. The apparatus of claim 1, wherein the set of audio tags are generated from a reference caption or audio.

7. The apparatus of claim 2, wherein the one or more processors are configured to eliminate redundant tags in at least one of the set of audio tags, the set of detections, the set of true positives, the set of false positives, or the set of false negatives.

8. The apparatus of claim 1, wherein the one or more processors are configured to:
- process a reference caption using a first audio tag extractor to generate the set of audio tags; and
- process the candidate caption using a second audio tag extractor to generate the set of detections.

9. The apparatus of claim 8, wherein the first audio tag extractor comprises a phrase extractor, a text embedding extractor, and a filter to process the reference caption to generate the set of audio tags.

10. The apparatus of claim 8, wherein the second audio tag extractor comprises a phrase extractor, a text embedding extractor, and a filter to process the candidate caption to generate the set of detections.

11. The apparatus of claim 1, wherein the one or more processors are configured to generate the corrected caption using a caption correction engine.

12. The apparatus of claim 11, wherein the caption correction engine comprises a phrase extractor to extract a phrase from the candidate caption, a phrase identifier to identify, based on a false alarm, a relevant phrase to remove from the phrase, a phrase remover to remove the relevant phrase from the phrase to generate a caption without false alarms, and a phrase introducer to introduce, based on a missed phrase, the missed phrase to the caption without false alarms to generate a caption with the missed phrase, wherein the corrected caption is based on the caption with the missed phrase.

13. The apparatus of claim 12, wherein the caption correction engine further comprises a grammar correction engine to receive the caption with the missed phrase and correct grammar errors to generate the corrected caption.

14. The apparatus of claim 1, wherein the one or more processors are configured to determine the set of false negatives using a first score-based set difference algorithm.

15. The apparatus of claim 14, wherein the one or more processors are configured to determine the set of false positives using a second score-based set difference algorithm.

16. The apparatus of claim 1, further comprising an output device configured to output the corrected caption.

17. The apparatus of claim 16, wherein the output device comprises at least one of one or more displays or one or more speakers.

18. A method for generating correct captions of input data, the method comprising:

receiving a set of audio tags associated with the input data;

receiving a set of detections, the set of detections generated from a candidate caption associated with the input data;

determining a set of false negatives in the candidate caption based on a first text-based comparison of the set of audio tags and the set of detections;

determining a set of false positives in the candidate caption based on a second text-based comparison of the set of audio tags and the set of detections; and generating, based on an addition of at least one missing term to the candidate caption based on the set of false negatives and removal of at least one false term from the candidate caption based on the set of false positives, a corrected caption relative to the candidate caption.

19. The method of claim 18, further comprising:

determining a set of true positives based on a third comparison of the set of audio tags and the set of detections; and generating the corrected caption further based on the set of true positives.

20. A non-transitory computer-readable medium having stored thereon instructions which, when executed by one or more processors, cause the one or more processors to be configured to:

receive a set of audio tags associated with input data;

receive a set of detections, the set of detections generated from a candidate caption associated with the input data;

determine a set of false negatives in the candidate caption based on a first text-based comparison of the set of audio tags and the set of detections;

determine a set of false positives in the candidate caption based on a second text-based comparison of the set of audio tags and the set of detections; and generate, based on an addition of at least one missing term to the candidate caption based on the set of false negatives and removal of at least one false term from the candidate caption based on the set of false positives, a corrected caption relative to the candidate caption.

* * * * *